April 29, 1941.          M. B. BENSON          2,239,839
DIFFERENTIAL GEARING
Filed July 28, 1939          3 Sheets-Sheet 3
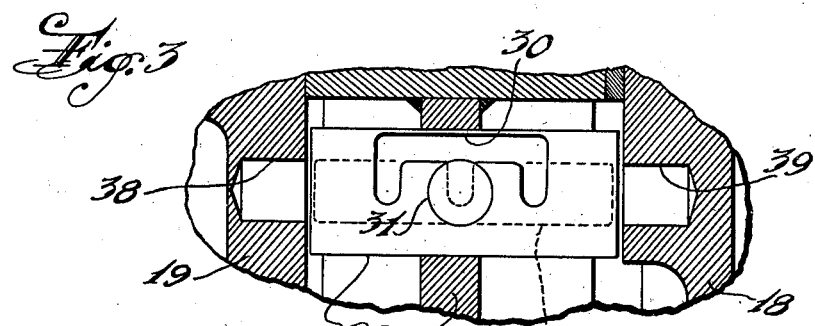
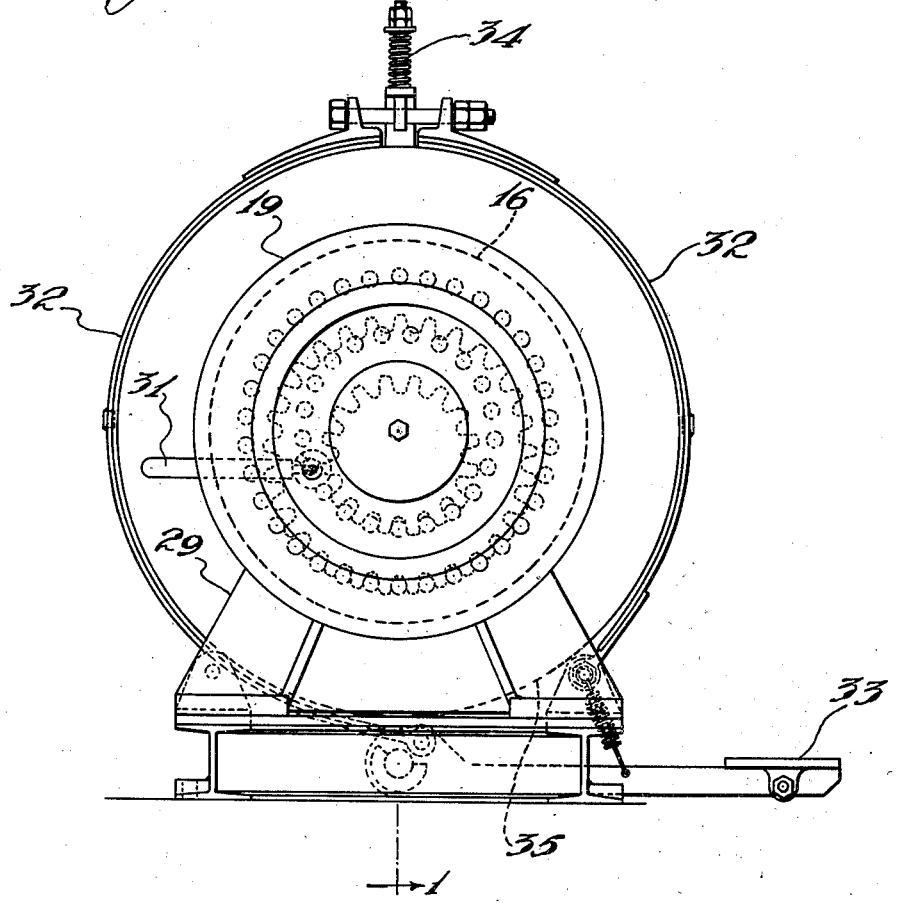
INVENTOR
Melvin B. Benson
BY
ATTORNEY Patented Apr. 29, 1941

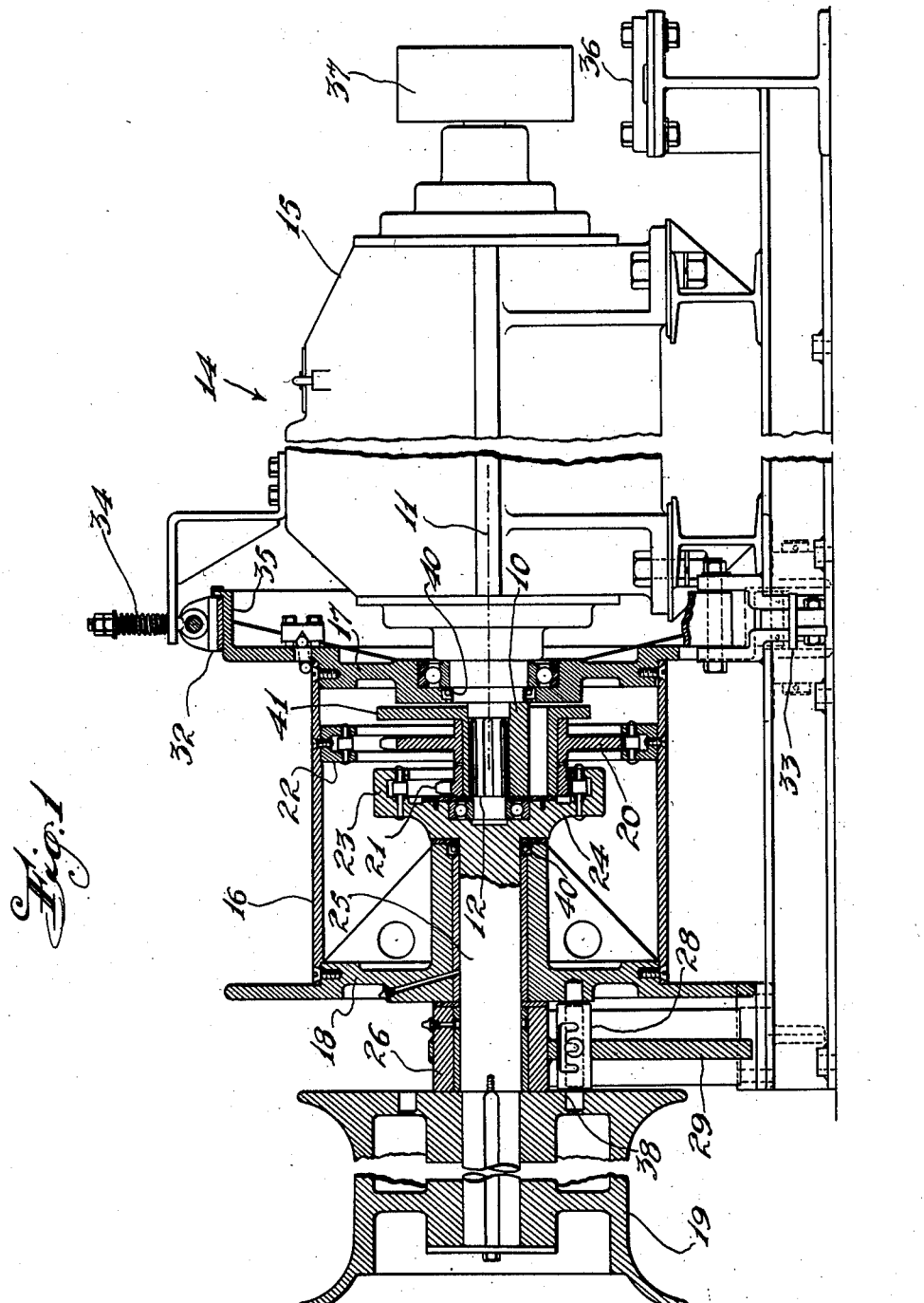

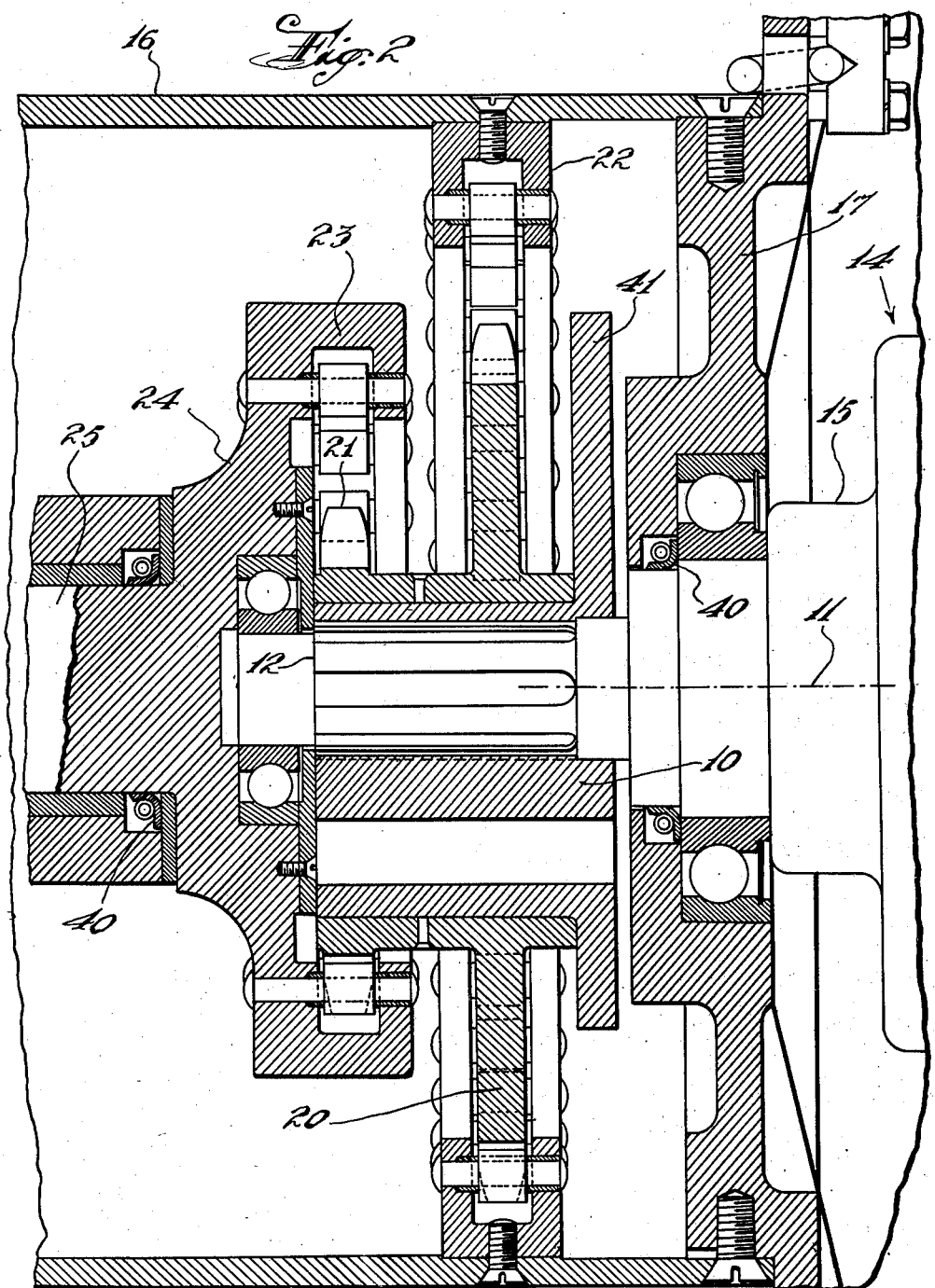

2,239,839

UNITED STATES PATENT OFFICE 2,239,839

DIFFERENTIAL GEARING

Melvin B. Benson, Plainfield, N. J., assignor to Lidgerwood Manufacturing Company, Elizabeth, N. J., a corporation of New York Application July 28, 1939, Serial No. 286,961

5 Claims. (Cl. 74—309)

My invention relates to improvements in differential gearing.

One of the objects of my invention resides in the provision of improved differential gearing adapted particularly for use in cargo winches, hoisting or towing apparatus, and conveyers, and which has advantages over the various forms of differential gearing proposed heretofore in the way of being simpler in construction and manner of operation, being more compact and therefore taking up substantially less space which is very important aboard ship, being more efficient, and having less parts for a given gear-reduction ratio and given operating capabilities.

Other objects and advantages will hereinafter appear.

For the purpose of illustrating my invention, an embodiment thereof is shown in the drawings, wherein—

Figure 1 is a side elevational view, partly in section, of a cargo winch embodying my invention, the section being taken on the line 1—1 in Fig. 4;

Figs. 2 and 3 are enlarged, fragmentary views, taken from Fig. 1; and

Fig. 4 is an end, elevational view, looking toward the right in Fig. 1.

In the drawings, the numeral 10 designates a drive member in the form of an eccentric rotatable about the axis of rotation 11 of and fixed on the power shaft 12, the latter being the armature shaft of the electric motor 14 or other power means and extending outwardly beyond the motor casing 15 and into the drum 16. The drum 16 encloses the differential unit, and has the end plates 17 and 18 at its respective ends and between which the differential unit is disposed.

For the purpose of illustration, my improved differential gearing has been shown embodied in a cargo winch for use aboard ship, and having the drum 16 and a gypsey 19.

The complementary elements making up the differential gearing or gear-reduction unit, include a gear element 20 and a gear element 21 fixed with respect to each other for rotation together. The gear elements 20 and 21 are disposed on the eccentric 10 to be driven or operated thereby, and are rotatable with respect to the eccentric about the axis of eccentricity thereof. A ring-gear 22 meshes with the gear element 20 and is fixed with respect to the drum 16, being thereby supported for rotation about the axis 11. A ring-gear 23 meshes with the gear element 21 and is embodied in the head 24 of an output shaft 25, being thereby supported for rotation about the axis 11. The output shaft 25 is journaled in a fixed bearing 26, and is disposed in alignment with the power shaft 12 for rotation about the axis 11. The output shaft being fixed with respect to the ring-gear 23, is thereby driven by the same.

Means for holding either of the ring-gears 22 and 23 against rotation, while at the same time permitting of free rotation of the other ring-gear, is shown as being in the form of a bolt 27 slideable in a fixed sleeve 28 and thereby supported for movement in the direction of its longitudinal axis. The sleeve 28 is fixed in the supporting stand or side bracket 29 for the bearing 26, and is provided with a slot 30 shaped as shown in Figs. 1 and 3, to accommodate a handle 31 which is fixed in the bolt 27 for moving the same.

A friction brake band 32, of a conventional construction, is supported from the motor casing, as shown, and is applied by a foot lever 33 to retard rotation of the drum 16 or to hold this drum against rotation. A spring 34 operates to release the brake band so that it will not drag on the associated brake drum or flange 35 when the foot lever 33 is released.

An electrical brake (not shown), and which may be of any suitable, conventional construction, is supported from the base plate 36, and when the motor 14 is shut down it grips the drum 37 fixed on the motor armature shaft to hold the power shaft 12 and the drive member or eccentric 10 against rotation.

The difference between the number of teeth of the ring-gear 22 and the number of teeth of the gear element 20 is the same as the difference between the number of teeth of the ring-gear 23 and the number of teeth of the gear element 21. In a practical application of my invention for a cargo winch, to obtain certain, definite gear-reduction ratios, the ring-gear 22 had 34 teeth, the gear element 20 had 29 teeth, the ring-gear 23 had 21 teeth, and the gear element 21 had 16 teeth.

In the operation of my improved differential gearing, when embodied as shown in a cargo winch, if the drum 16 is to operate, the handle 31 is raised to unlock it, is shoved to the left, as viewed in Fig. 3, from the neutral position in which it is shown, and is then lowered to lock it in position. The bolt 27 is thereby also moved to the left, and enters a hole 38 in the adjacent face of the gypsey, whereby the gypsey, the output shaft 25, and the ring-gear 23 are held against rotation. With the motor 14 running to rotate the drive member or eccentric 10 about the axis 11, the gear element 21 will be caused to ride around the associated ring-gear 23, and likewise, the gear element 20 will be caused to ride around the associated ring-gear 22. On account of the difference in the number of teeth of the ring-gear 23 and the gear element 21, and the fact that they are in mesh with the ring-gear 23 fixed and the gear element 21 revolving about the axis of eccentricity, the gear element 21 will now be caused to rotate on the eccentric 10 in the direction opposite to the direction of rotation of the eccentric, and to carry with it the gear element 20. The gear element 20 being in mesh with the ring-gear 22, the drum 16 will be driven by the gear element 20 and caused to rotate in the direction opposite to the direction of rotation of the motor or power shaft 12, and at a definite speed-reduction as determined by the particular difference in number of teeth of the respective parts.

If the gypsey 19 is to operate, the handle 31 is raised as before to unlock it, is shoved to the right, as viewed in Fig. 3, and is then lowered to lock it in position. The bolt 27 is thereby also moved to the right, and enters a hole 39 in the adjacent end plate 18 of the drum 16, whereby the drum and the ring-gear 22 are held against rotation. With the motor 14 running to rotate the drive member or eccentric 10 about the axis 11 as before, the gear element 20 will be caused to ride around the associated ring-gear 22, and likewise, the gear element 21 will be caused to ride around the associated ring-gear 23. As in the other case, on account of the difference in the number of teeth of the ring-gear 22 and the gear element 20, and the fact that they are in mesh with the ring-gear 22 fixed and the gear element 20 revolving about the axis of eccentricity, the gear element 20 will now be caused to rotate on the eccentric 10 in the direction opposite to the direction of rotation of the eccentric, and to carry with it the gear element 21. The gear element 21 being in mesh with the ring-gear 23, the output shaft 25 and the gypsey 19 will be driven by the gear element 21 and caused to rotate in the direction opposite to the direction of rotation of the motor or power shaft 12, and at a definite speed-reduction as determined by the particular difference in number of teeth of the respective parts.

By having the gear-reduction unit disposed in a drum 16, as shown, it can be made to run continuously in an oil bath, for which purpose suitable seals 40 are provided at the bearings to prevent oil leakage from the drum.

The eccentric 10 may be provided with a counterbalance lug or part 41, and may also be cored as shown, for further balancing if necessary.

An important advantage of my improved differential gearing resides in the fact that there is always a relatively large number of teeth in mesh, so that the load is distributed over as many teeth. This permits lighter construction throughout, for a given safety factor.

Other advantages are that when my improved differential gearing is embodied in a cargo winch, for example, the winch is comparatively easy to install, and is either righthand or lefthand.

Furthermore, by supporting one end of the drum 16 from the motor casing 15 through the end plate 17, as shown, the necessity for another fixed bearing such as the bearing 26 is eliminated. The motor or power shaft 12 can then be fixed directly to the drive member or eccentric 10, thereby eliminating requirement of a coupling between the motor and the gear-reduction unit, as heretofore. Still further, the motor 14 can be removed for repair or replacement without dismantling or in any way disturbing the differential gearing and the associated parts of the winch. Also, no clutch between the motor and drum is necessary, because in lowering a load from the drum, the gypsey can be released by putting the bolt 27 in the neutral position thereof shown in Fig. 3. The gypsey 19 will then idle in the reverse direction from the drum through the differential gearing, the motor brake will be set, and the load will be lowered on the hand or foot brake 32, 33.

The terms "gear" and "teeth" are used to describe and claim my invention in the most convenient and simplest way, but are intended to be construed broadly. For example, the gear elements 20 and 21 may be sprocket gears, and the ring-gears 22 and 23 may have their "teeth" in the form of rollers, as shown in the drawings. Furthermore, for relatively light work, the gear elements 20 and 21 may even be in the form of discs and the ring-gears 22 and 23 in the form of friction surfaces engaged respectively by these discs. In such a case, the "teeth" would be the minute or microscopic irregularities which form the engaging frictional surfaces and which mesh together in the same fashion as teeth do.

It will be understood that various modifications within the conception of those skilled in the art, are possible without departing from the spirit of my invention or the scope of the claims.

I claim as my invention:

1. Differential gearing comprising a drive member in the form of an eccentric rotatable about a given axis, a first gear element and a second gear element fixed with respect to each other for rotation together, said gear elements being associated with said eccentric to be operated thereby and rotatable with respect to said eccentric about the axis of eccentricity thereof, a first ring-gear meshing with said first gear element and supported for rotation about said given axis, a second ring-gear meshing with said second gear element and supported for rotation about said given axis, power means for said gearing having a casing and a power shaft fixed with respect to said eccentric for rotating the same about said given axis, a drum enclosing said gear elements and said ring-gears, said first ring-gear being fixed with respect to said drum, a fixed bearing, said drum at one end thereof being supported directly by said casing and at its other end by said bearing for rotation about said given axis, and means for holding either said drum or said second ring-gear against rotation while at the same time permitting of rotation of the other.

2. Differential gearing comprising a drive member in the form of an eccentric rotatable about a given axis, a first gear element and a second gear element fixed with respect to each other for rotation together, said gear elements being associated with said eccentric to be operated thereby and rotatable with respect to said eccentric about the axis of eccentricity thereof, a first ring-gear meshing with said first gear element and supported for rotation about said given axis, a second ring-gear meshing with said second gear element and supported for rotation about said given axis, a drum enclosing said gearing and to which said first ring-gear is fixed, means for holding either of said ring-gears against rotation while at the same time permitting of rotation of the other ring-gear, said holding means being in the form of a bolt movable in the direction of its longitudinal axis to one position to hold said first ring-gear against rotation and to another position to hold said second ring-gear against rotation, and means supporting said bolt for such movement.

3. Differential gearing comprising a drive member in the form of an eccentric rotatable about a given axis, a first gear element and a second gear element fixed with respect to each other for rotation together, said gear elements being associated with said eccentric to be operated thereby and rotatable with respect to said eccentric about the axis of eccentricity thereof, a first ring-gear meshing with said first gear element and supported for rotation about said given axis, a second ring-gear meshing with said second gear element and supported for rotation about said given axis, a fixed bearing, an output shaft extending from and fixed with respect to said second ring-gear for rotation about said given axis and being journaled in and supported by said bearing, power means for said gearing having a casing and a power shaft fixed with respect to said eccentric for rotating the same about said given axis, a drum enclosing said gear elements and said ring-gears, said first ring-gear being fixed with respect to said drum, said drum at one end thereof having a bearing on and being supported directly by said casing and at its other end having a bearing on and being supported by said output shaft for rotation about said given axis, and means for holding either said drum or said output shaft against rotation while at the same time permitting of rotation of the other.

4. Differential gearing comprising a drive member in the form of an eccentric rotatable about a given axis, a first gear element and a second gear element fixed with respect to each other for rotation together, said gear elements being associated with said eccentric to be driven thereby and rotatable with respect to said eccentric about the axis of eccentricity thereof, a first ring-gear meshing with said first gear element and supported for rotation about said given axis, a second ring-gear meshing with said second gear element and supported for rotation about said given axis, an output shaft disposed for rotation about said given axis and fixed with respect to said second ring-gear to be driven thereby, a drum enclosing said gearing and to which said first ring-gear is fixed, and means for holding either said first ring-gear or said output shaft against rotation while at the same time permitting of rotation of the other.

5. Differential gearing comprising a drive member in the form of an eccentric rotatable about a given axis, a first gear element and a second gear element fixed with respect to each other for rotation together, said gear elements being associated with said eccentric to be driven thereby and rotatable with respect to said eccentric about the axis of eccentricity thereof, a first ring-gear meshing with said first gear element and supported for rotation about said given axis, a second ring-gear meshing with said second gear element and supported for rotation about said given axis, power means for said gearing having a power shaft fixed with respect to said eccentric for rotating the same about said given axis, a drum enclosing said gear elements and said ring-gears, said first ring-gear being fixed with respect to said drum, an output shaft disposed in alignment with said power shaft for rotation about said given axis and being fixed with respect to said second ring-gear to be driven thereby, and means for holding either said first ring-gear or said output shaft against rotation while at the same time permitting of rotation of the other.

MELVIN B. BENSON.